(12) United States Patent
Craig et al.

(10) Patent No.: US 6,628,072 B2
(45) Date of Patent: Sep. 30, 2003

(54) ACICULAR PHOTOMULTIPLIER PHOTOCATHODE STRUCTURE

(75) Inventors: Richard A. Craig, West Richland, WA (US); Mary Bliss, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 38 days.

(21) Appl. No.: 09/855,043

(22) Filed: May 14, 2001

(65) Prior Publication Data

US 2002/0167254 A1 Nov. 14, 2002

(51) Int. Cl.[7] .................................................. H01J 40/06
(52) U.S. Cl. .......................... 313/542; 313/527; 313/539
(58) Field of Search ..................... 313/103 R, 103 CM, 313/379, 384, 542, 528, 530, 527, 532, 533, 539, 105 R, 105 CM

(56) References Cited

U.S. PATENT DOCUMENTS

| | | | |
|---|---|---|---|
| 4,287,230 A | 9/1981 | Galves et al. ................... 427/65 |
| 4,613,786 A | 9/1986 | Holland et al. ................ 313/528 |
| 5,311,098 A | 5/1994 | Seely et al. ................... 313/542 |
| 5,368,882 A | 11/1994 | Tran et al. ..................... 427/65 |
| 5,371,435 A | 12/1994 | Ohishi et al. ................. 313/532 |
| 5,391,259 A | 2/1995 | Cathey et al. ................ 156/643 |
| 5,587,621 A | * 12/1996 | Colditz ........................ 313/366 |
| 5,646,477 A | * 7/1997 | Yamnagishi ................. 313/365 |
| 5,656,525 A | 8/1997 | Lin et al. ....................... 216/11 |
| 5,684,360 A | 11/1997 | Baum et al. ................. 313/542 |
| 5,704,890 A | 1/1998 | Bliss et al. ...................... 600/1 |
| 5,930,590 A | 7/1999 | Busta ............................ 438/20 |
| 5,977,705 A | 11/1999 | Sinor et al. ................... 313/542 |
| 5,981,305 A | 11/1999 | Hattori ........................... 438/20 |
| 5,981,959 A | 11/1999 | Apte ......................... 250/483.1 |
| 5,982,093 A | 11/1999 | Nihashi et al. .............. 313/542 |
| 5,982,094 A | 11/1999 | Niigaki et al. ............... 313/542 |
| 6,008,064 A | 12/1999 | Busta ............................ 438/20 |
| 6,057,172 A | 5/2000 | Tomihari ...................... 438/20 |
| 6,136,621 A | 10/2000 | Jones et al. ................... 438/20 |

* cited by examiner

Primary Examiner—Ashok Patel
(74) Attorney, Agent, or Firm—Woodard, Emhardt, Moriarty, McNett & Henry LLP

(57) ABSTRACT

A method and apparatus for increasing the quantum efficiency of a photomultiplier tube by providing a photocathode with an increased surface-to-volume ratio. The photocathode includes a transparent substrate, upon one major side of which is formed one or more large aspect-ratio structures, such as needles, cones, fibers, prisms, or pyramids. The large aspect-ratio structures are at least partially composed of a photoelectron emitting material, i.e., a material that emits a photoelectron upon absorption of an optical photon. The large aspect-ratio structures may be substantially composed of the photoelectron emitting material (i.e., formed as such upon the surface of a relatively flat substrate) or be only partially composed of a photoelectron emitting material (i.e., the photoelectron emitting material is coated over large aspect-ratio structures formed from the substrate material itself.) The large aspect-ratio nature of the photocathode surface allows for an effective increase in the thickness of the photocathode relative the absorption of optical photons, thereby increasing the absorption rate of incident photons, without substantially increasing the effective thickness of the photocathode relative the escape incidence of the photoelectrons.

14 Claims, 5 Drawing Sheets

ACICULAR PHOTOMULTIPLIER PHOTOCATHODE STRUCTURE

This invention was made with Government support under contract DEAC06-76RL01830 awarded by the U.S. Department of Energy. The Government has certain rights in the invention.

TECHNICAL FIELD OF THE INVENTION

The present invention relates generally to photoemitting devices and, more particularly, to a photomultiplier having a photocathode with a photoemitting surface characterized by a plurality of acicular or large aspect-ratio photoemitting structures, and a method for the production thereof.

BACKGROUND OF THE INVENTION

Photomultiplier tubes, as illustrated in FIG. 1, operate by making use of the process of photoemission, whereby a photon of sufficient energy to actuate the emission of an electron is captured by a photocathode 12. The resultingly emitted photoelectron exits the photocathode 12; while the initial emission direction is unpredictable, the photomultiplier tube 10 is designed such that the majority of photoelectrons emitted from the photocathode 12 are directed towards an amplifier 14. The amplifier 14 is typically a series or string of dynodes 16 ending in a terminal anode 18 positioned to maximize the probability of reception of photoelectrons emitted from the photocathode 12. The anode 18 generates an electric potential to help direct the flow of photoelectrons toward the anode 18. A photoelectron striking a dynode 16 in the amplifier string actuates the secondary emission of additional electrons. An electron stream is thusly created and urged toward the anode 18, with each dynode 16 sequentially receiving a number of electrons travelling from the previous dynode 16 in the string and increasing the electron flow by releasing a plurality of secondary electrons to the next dynode 16 for each one received from the previous dynode 16. In this way, a photomultiplier tube 10 can amplify the single-electron signal generated by the emission of one photoelectron actuated by the reception of a single photon by the photocathode 12 on the order of a million (1,000,000X) or more. Although the above describes a typical arrangement, alternative arrangements for multiplication are commonly used. One such alternative arrangement is that of the multichannel plate in which multiplication occurs in a plurality of high-aspect ratio channels, which have been formed into a material suitable for such multiplication.

FIG. 2 illustrates a typical prior art photocathode 12 in greater detail. The photocathode 12 is formed as a flat layer of photoemissive material. In this embodiment, the photoemissive material is formed on a substrate 20 (here, a photomultiplier tube window, although the substrate may be separate from the window). The photocathode 12 has two major sides, a first major side 22 through which incident photons, in the energy range corresponding to ultraviolet, visible, or near infrared radiation, hereinafter referred to as optical or light, are received and a second, opposite major side 24 through which photoelectrons are desired to be emitted. The second major side 24 is substantially smooth and positioned equidistant from the first major side 22. While the photocathode 12 of FIG. 2 is depicted as being substantially flat, it should be noted that some photocathodes 12 have some degree of curvature.

In a second common implementation, referred to as reflection mode, the photocathode is substantially thick and the optical photons and the photoelectrons are emitted from the same surface. Following emission, the photoelectrons continue on to the dynode string or equivalent amplifying system as described above. In this geometry, the photocathode is effectively infinitely thick so that photons can interact and photoelectrons can originate from a point much further from the photocathode than is the case for optically thin photocathodes as described above.

One important parameter characterizing the efficiency of a photomultiplier is quantum efficiency. The quantum efficiency of the photomultiplier tube is defined as the ratio of the number of output pulses to the number of input photons. Typically, photomultiplier tubes have a maximum quantum efficiency of about 25%. Two major competing factors currently combine to limit the quantum efficiency of typical photomultiplier tubes. First, a photoelectron emitted from a typical photocathode may be recaptured by the photocathode. Even if the photoelectron is not recaptured, it may leave the photocathode travelling in any direction, including towards the photon source and away from the amplifier. Second, photons may pass through the photocathode without being captured. If the photocathode is made thicker so as to increase the incidence of photon absorption, it becomes more difficult for a photoelectron to escape the photocathode. Conversely, if the photocathode is made thin enough so that substantially all of the photoelectrons can escape the photocathode, the photocathode will also allow an unacceptably large number of photons to pass therethrough without generating photoelectrons. Photocathodes operating in the conventional geometry and photocathodes operating in the reflection geometry have approximately the same quantum efficiency indicating that the conventional geometry is well optimized for balancing these two phenomena. Currently, the photocathode is produced with an intermediate compromise thickness that correlates to a maximum quantum efficiency of about 20–25% although very recently GaAs and GaAlAs photomultiplier tubes have been commercially introduced with quantum efficiencies, at the most efficient wavelengths, and when cooled, of up to 45%.

There is therefore a need for a photocathode design that allows for increased photoelectron emission without correspondingly increased photon transmission and, more preferably, with increased photon absorption resulting in photoemission. The present invention is directed towards meeting this need.

SUMMARY OF THE INVENTION

The present invention relates to a photocathode design having an increased surface-to-volume ratio for the purpose of increased quantum efficiency. The photocathode includes a transparent substrate, upon one major side of which is formed a plurality of large aspect-ratio structures, such as needles, cones, or pyramids. In a degenerate case, the structure can be as simple as a single large aspect-ratio structure, such as a film, arranged such that, effectively, photoelectrons may be emitted from both sides of the structure. The large aspect-ratio structures are at least partially composed of a photoelectron emitting material, i.e., a material that emits a photoelectron upon absorption of an optical photon. The large aspect-ratio structures may be substantially composed of the photoelectron emitting material (i.e., formed as such upon the surface of a relatively flat substrate) or be only partially composed of a photoelectron emitting material (i.e., the photoelectron emitting material is coated over large aspect-ratio structures formed from the substrate material itself.) The large aspect-ratio nature of the photocathode surface allows for an effective increase in the thickness of the photocathode relative the absorption of optical photons, thereby increasing the absorption efficiency of incident photons, without substantially decreasing the effective thickness of the photocathode relative the escape incidence of the photoelectrons. This is at least in part because the large aspect-ratio nature of the photocathode electron emission surface facilitates the emission of electrons. In other words, it is much easier for an electron to be emitted from the tip of a cone or needle than from a flat surface.

One object of the present invention is to provide an improved photocathode device. Related objects and advantages of the present invention will be apparent from the following description.

DETAILED DESCRIPTION OF THE PREFERRED EMBODIMENT

Figure 1:
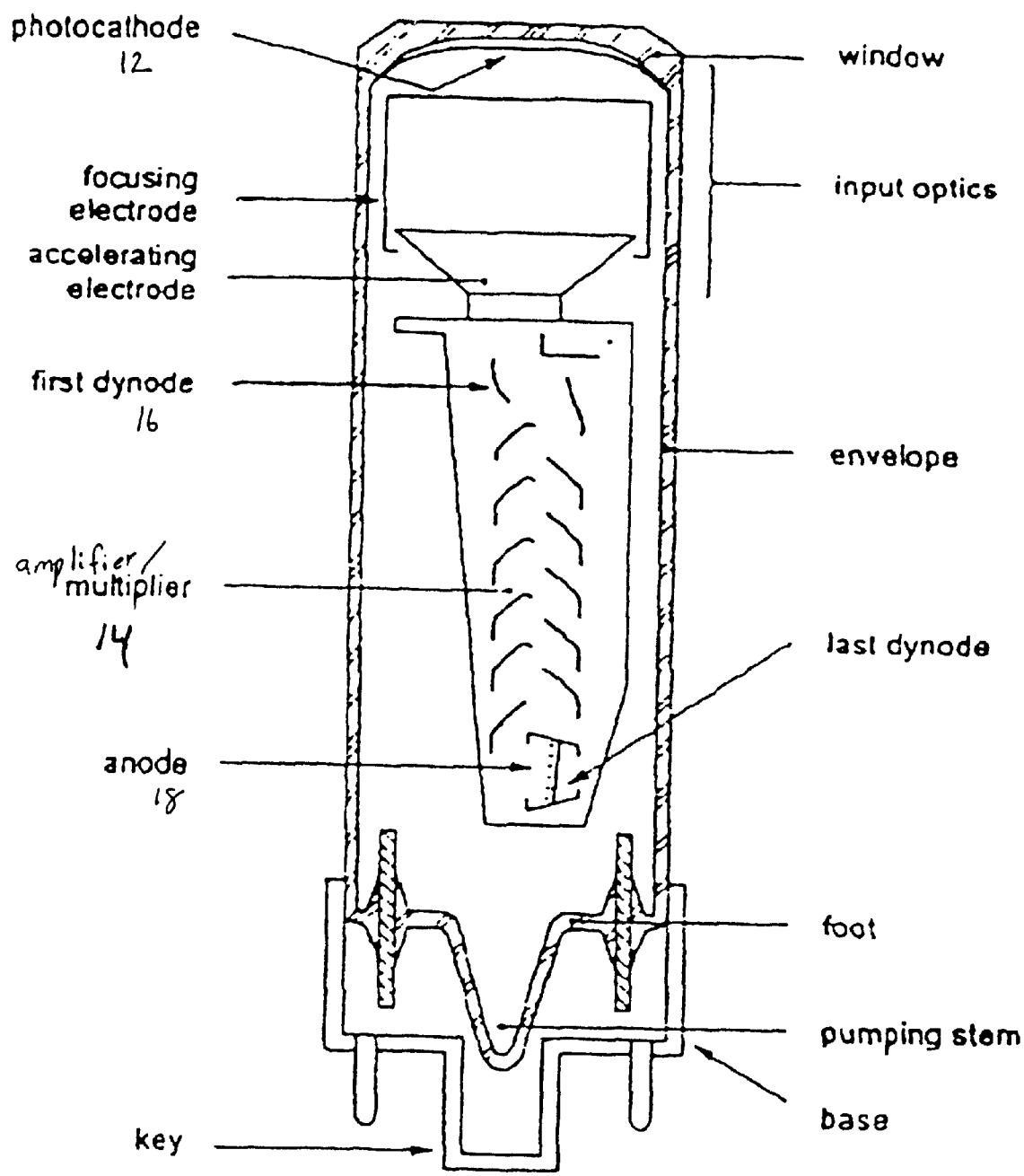
FIG. 1 is a diagramatic view of a typical prior art photomultiplier tube.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3B:
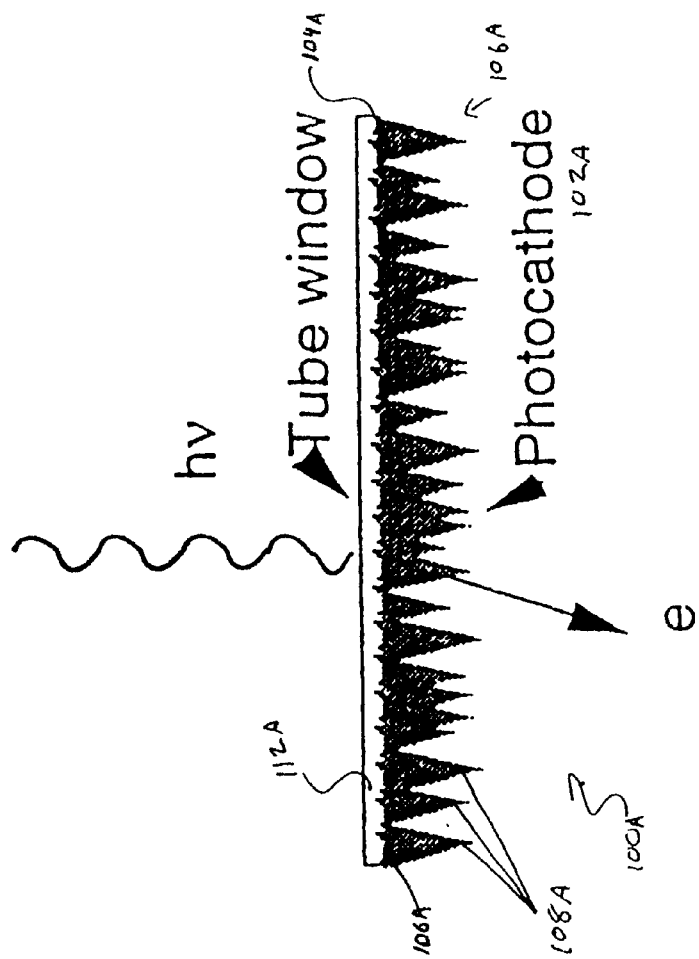
FIG. 3B is a side sectional schematic view of a second embodiment high surface-to-volume ratio photocathode of the present invention with an large aspect-ratio photocathode formed over a smooth substrate.
Figure 2:
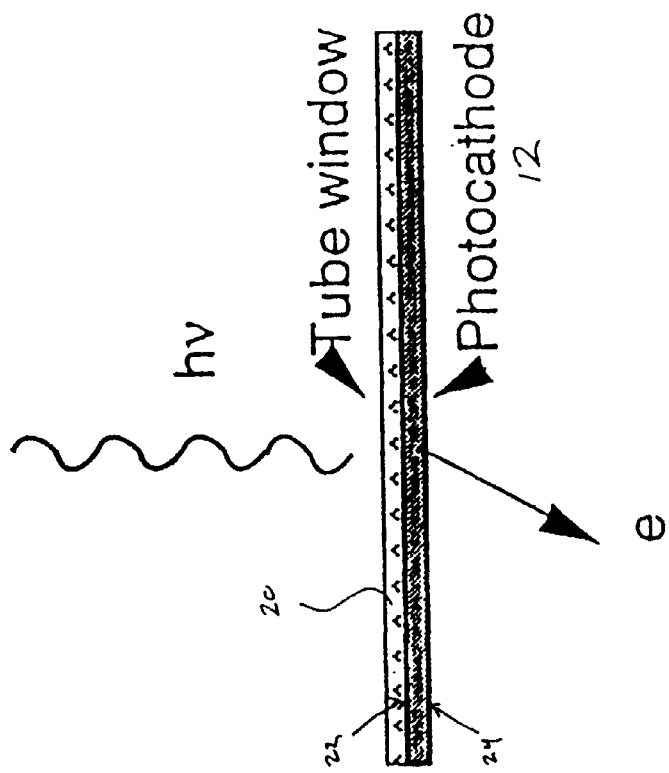
FIG. 2 is a side sectional schematic view of a typical prior art photocathode.
Figure 3A:
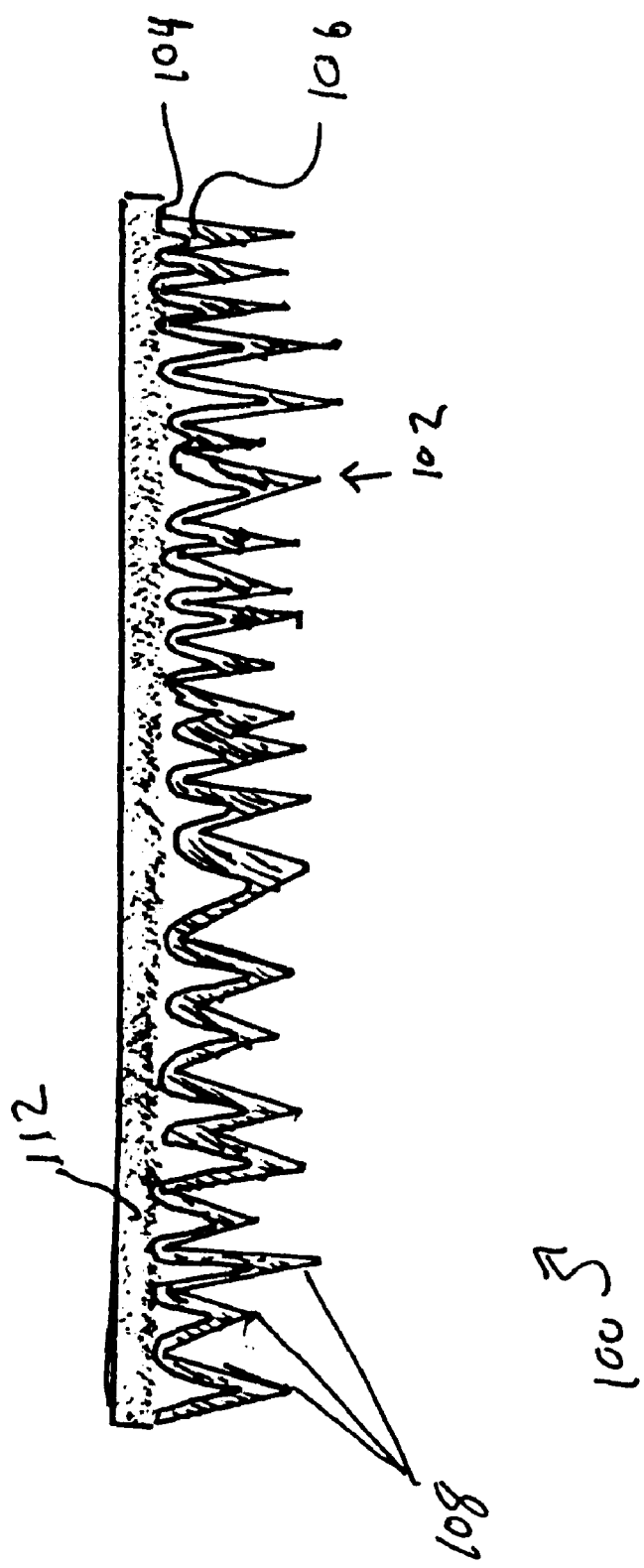
FIG. 3A is a side sectional schematic view of a first embodiment high surface-to-volume ratio photocathode of the present invention with a large aspect-ratio photocathode formed over an large aspect-ratio substrate.

FIG. 3A illustrates a first embodiment of the present invention, a photocathode device 100 having high surface-to-volume ratio. The photocathode device 100 includes a photocathode layer 102 having a substantially smooth first major surface 104 through which photons may enter and a second major surface 106 through which photoelectrons may exit. The second major surface 106 is characterized by a plurality of large aspect-ratio structures 108 extending therefrom. The large aspect-ratio structures 108 preferably have average aspect ratios of at least about 3:1, more preferably of about 10:1, and still more preferably of at about 50:1, and yet more preferably of about 100:1, although the average aspect ratio of the structures 108 may be any value that contributes to a substantial increase of the ratio of the surface area to the volume of the photocathode layer 102. For our purposes, the aspect ratios are measures of the major axis of the structure 108 (i.e., its length) to the mean width of the structure 108. In other words, the aspect ratio of a structure is independent of its directional orientation.

The large aspect-ratio structures 108 are preferably a few microns in length, and are more preferably about 3 microns long, although they may have any convenient length. The large aspect-ratio structures 102 preferably have substantially conical shapes, such that the bases of the conical large aspect-ratio structures 108 contribute to a photocathode layer thick enough to absorb a high percentage of incident photons. However, the large aspect-ratio structures 108 may have any large aspect-ratio shape, such as acicular, pyramidal or the like, so long as the large aspect-ratio structures 108 are positioned to form a photocathode layer 102 with an effective thickness sufficient to efficiently absorb the incident photons passing thereinto. Moreover, the large aspect-ratio shapes do not have to be geometrically "perfect", but may instead be rough approximations of cones, needles, pyramids, or the like, so long as the large aspect-ratio structures contribute to a substantially increase in the effective surface area-to-volume ratio of the second major surface 106. Accordingly, the large aspect-ratio structures 108 do not all have to have the same large aspect-ratio shape, but may include a number of large aspect-ratio shapes 108 combined and distributed to maximize the photon absorption efficiency of the photocathode layer 102 while simultaneously maximizing the efficiency at which photoelectrons exit the photocathode layer 102. Likewise, the large aspect-ratio structures 108 need not all extend substantially perpendicularly to the first major surface 104, but may be substantially oriented at some angle thereto and may even extend in a criss-crossed, or "thatched" pattern.

The photocathode layer 102 is preferably formed over a substrate 112 or made freestanding for photoelectron emission from both sides, as described below. The substrate 112 is preferably formed from a transparent material. The substrate 112 may be part of a photomultiplier system, such as the window, or may be a separate member. The substrate 112 may include large aspect-ratio substrate structures 114 extending therefrom upon which photoemissive material may be coated to form the large aspect-ratio structures 108. The large aspect-ratio substrate structures 114 are not necessarily required to have the same large aspect ratios of the resulting large aspect-ratio structures 108 formed over them, but may instead function to guide the formation and distribution of those large aspect-ratio structures 108.

Figure 3C:
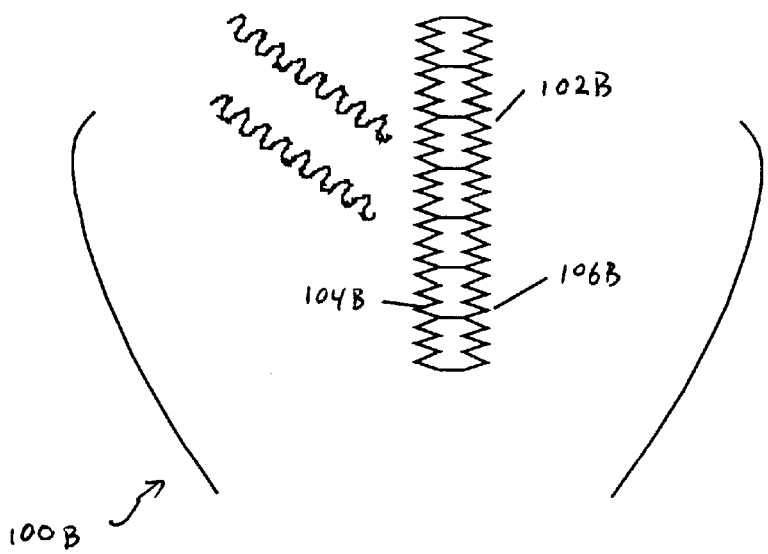
FIG. 3C is a side sectional schematic view of a third embodiment high surface-to-volume ratio photocathode of the present invention with an large aspect-ratio photocathode formed independently of a substrate.

Alternately, device 100A may include a substrate 112A having a substantially smooth major surface 116A upon which the photocathode layer 102A is formed, the large aspect-ratio structures 108A being formed substantially entirely of photoemissive material (see FIG. 3B). Still alternately, the device 100B may include a photocathode layer 102B formed without a substrate (see FIG. 3C). Both of these embodiments still include a first major surface 104A, B through which photoelectrons may enter and a second major surface 106A, B through which photoelectrons may exit.

The photocathode layer 102 may be formed of any photoemissive or photoelectric converting material. Commonly, such materials are composed of antimony or the alkali metals sodium, potassium, or rubidium or other metals, generally in concert with cesium. However, other materials such as column III-V compounds (i.e., a material combining a column III element, such as gallium, aluminum, and indium, with a column V element, such as phosphorus, arsenic, and nitrogen) have found application for such purpose, generally in concert with cesium. Gallium arsenide:cesium is an example of a column III-V photoemissive compound. Other photoemissive materials include silicon carbide, amorphous diamond-like carbon, diamond, carbon nanotubes, and quantum dots. Silicon carbide, amorphous diamond-like carbon, and diamond offer the advantages of very good hardness, toughness, elastic modulus and structural strength, which are desirable for forming and maintaining tiny high aspect ratio acicular members.

Figure 3D:
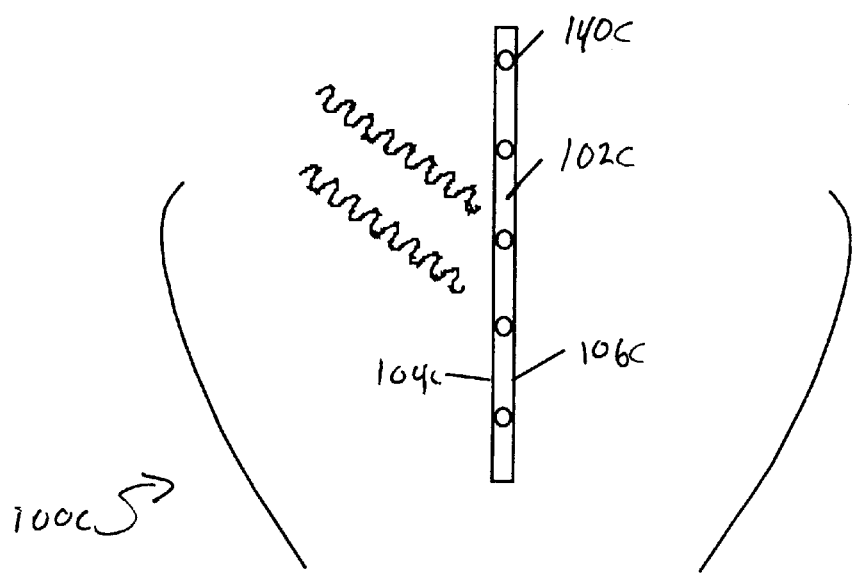
FIG. 3D is a side sectional schematic view of a fourth, degenerate, embodiment of a large surface-to-volume ratio photocathode of the present invention consisting of a single photocathode formed in such a way that a photoelectron can be emitted in either direction.

FIG. 3D illustrates a degenerate embodiment 100C of the present invention in which the photocathode layer 102C is a photoemitting surface sufficiently thin that photoelectrons originating from any part of the photocathode layer 102C have a high likelihood of exiting the surface. As in the above embodiments, the photocathode device 100C includes a photocathode layer 102C having a substantially smooth first major surface 104C through which photons may enter and a second major surface 106C through which photoelectrons may exit. The photocathode layer 102C is preferably formed from a photocathode material with a refractive index that is sufficiently small that photons are guided in the material, thereby ensuring that the photons experience many opportunities to interact with the material. Many such low refractive index photocathode materials are well known in the art. Such a thin film photocathode layer 102C is inherently fragile, and may be reinforced with strength members 140C, in the manner of "ripstop" fabric or the like.

Figure 4:
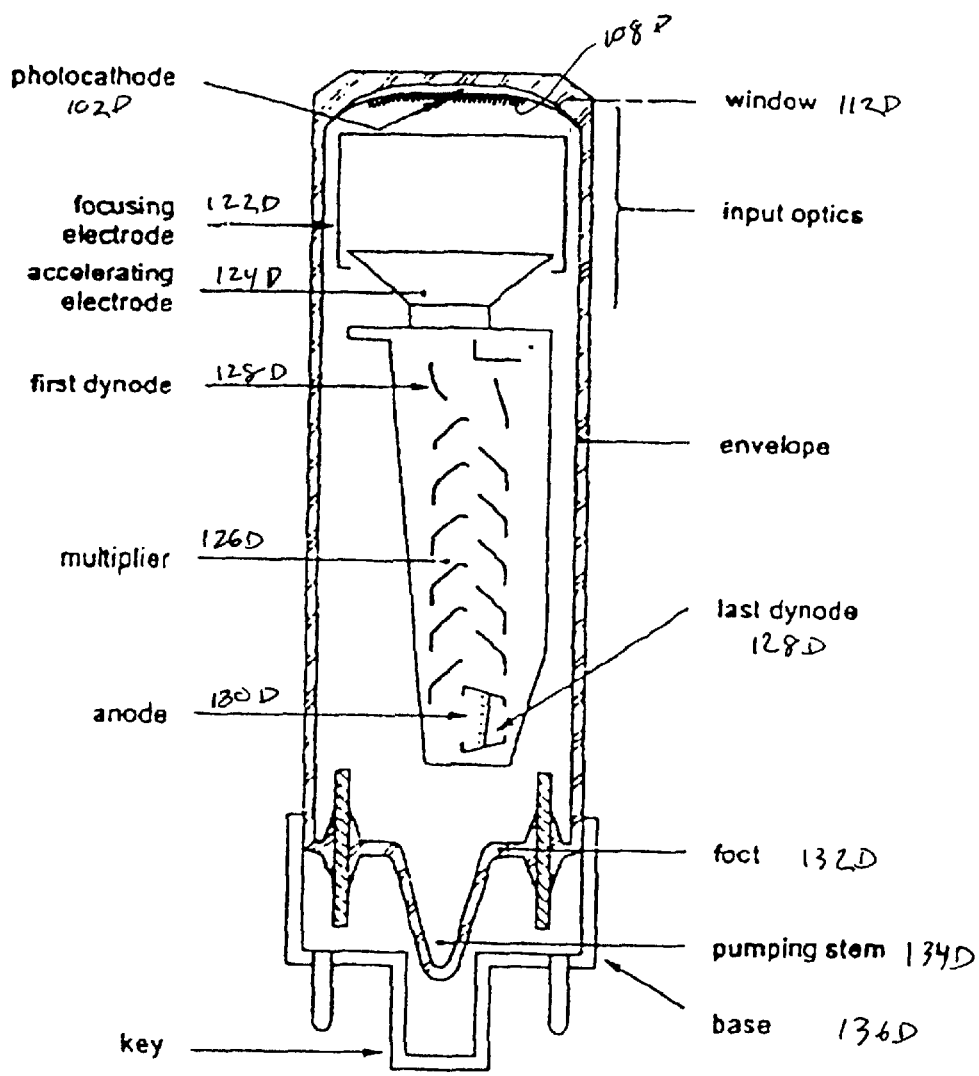
FIG. 4 is a diagramatic view of a photomultiplier tube including the photocathode of FIG. 3.

FIG. 4 illustrates another embodiment of the present invention, a photomultiplier tube 120D having a transparent window 112D formed in one end to which a photocathode 102D is connected. The photocathode 102D has a plurality of large aspect-ratio structures 108D formed on the major side positioned opposite the window 112D. The large aspect ratio structures 108D are composed at least in part of photoemissive material, and preferably have average aspect ratios in excess of about 3:1. More preferably, the large aspect-ratio structures 108D have average aspect ratios of at least about 10:1, still more preferably of about 50:1, and yet more preferably the large aspect-ratio structures 108D have aspect ratios in excess of about 100:1.

Sufficiently energetic photons entering the tube through the window 112D can be captured by the photocathode 112D, actuating the production of a photoelectron. A focussing electrode 122D and an accelerating electrode 124D are positioned adjacent the photocathode 102D, such that, when energized, photoelectrons exiting the photocathode 102D will be focussed by the electric field of the focussing electrode 122D into the accelerating electrode 124D, where they will be accelerated. An amplifier 126D is positioned such that accelerated photoelectrons exiting the accelerator 124D will be amplified into electron streams that exit the amplifier 126D as pulses. Preferably, the amplifier 126D includes a series or string of dynodes 128D terminating in an anode 130D. More preferably, the string of dynodes 128D is oriented such that secondary electrons created by an electron striking the first dynode 128D will be deflected into the second dynode 128D. Each dynode 128D in the string will thusly receive more electrons than the prior dynode 128D, and send them in turn to the next dynode 128D. The anode 130D provides an attractive force to urge the electron pulse through the amplifier 126D. Preferably, the amplifier 126D is capable of amplifying the initial photoelectron into a pulse of a million or more electrons.

The photomultiplier tube 120D further includes a foot 132D having a pumping stem 134D integrally formed therein. A base 136D is formed in the end opposite the window 122D.

In operation, the large aspect-ratio structures 108 allow the photocathode 102 to absorb more of the energetic photons entering therein. Further, the relatively sharp tips of the large aspect-ratio structures 108 effectively decrease the work function of the emitted photoelectron, reducing the incidence of the photoelectron failing to escape the photocathode 102. The sharp tips of the large aspect-ratio structures 108 also allow for increased control in directing the photoelectrons exiting the photocathode layer 102. Moreover, since the large aspect-ratio structures 108 are very thin due to their aspect ratios, the photoelectron has a short travel path to escape from within an large aspect-ratio structure 108 (unless travelling undeflected in a direction nearly parallel the major axis of the large aspect-ratio structure 108, which is unlikely over any appreciable distance of travel).

The large-aspect ratio photocathode 102 may be formed by any convenient means, such as by deposition of photoemissive material on a substrate 112, followed by etching to create the large aspect-ratio structure. Alternately, the photocathode layer 102 may be deposited on a substrate 112 by any convenient deposition means, such as sputtering, evaporation, electrodeposition, soot deposition, aerogel coating, electrostatic coating, Langmuir-Blodgett films, solution dips, spin coating, or the like. By controlling the deposition process, a dense region of large aspect-ratio structures 108 having high aspect ratios may be produced. The choice of photoemissive material may be influenced by the deposition technique used for ease of formation the large aspect-ratio structures 108. Also, the mechanical properties of the photoemissive material may also factor into its selection. In other words, if the large aspect-ratio structures 108 are formed as stand-alone structures, a strong and tough photoemissive material may be preferred. This is especially true if the large aspect-ratio structures have the shape of thin needles. Additionally, the photoemissive material may be densified, annealed, or conditioned such as through the application of heat, after deposition. The densification and deposition steps may be performed more than once.

Alternately, the photoemissive material may be deposited on a transparent substrate 112 having large aspect-ratio structures of the appropriately high aspect ratios already formed or patterned thereon. The large aspect-ratio structures 112 may be formed by any convenient means, such as by etching or physical bombardment of the surface by a fine grit under pressure. The photoemissive material may be so deposited by any convenient techniques known in the art, such as by spraying, ion milling, photolithography, immersion, chemical vapor deposition, or the like, in addition to the ones described above. If the substrate 112 has a refractive index higher than that of the photoemissive material, total internal reflection effects will result in a waveguide being produced, having the effect of directing optical photons through a given large aspect-ratio structure 108 towards its tip and increasing the probability of the emission of a photoelectron from the near the sharp tip of the large aspect-ratio structure 108. Such a waveguide effect increases the quantum efficiency of the photocathode 102, since increasing the incidence of photons absorbed near the tip of the large aspect-ratio structure 108 increases the incidence of photoelectrons emitted near the tip, decreasing the probability of photoelectron recapture and increasing the probability of the photoelectron both escaping the photocathode 102 and escaping the photocathode 102 with a desirable velocity.

Yet alternately, the photoemissive material may be deposited on a web structure formed of web fibers having diameters smaller than the escape distance of a photoelectron and having large open areas relative to the diameter of the web fibers. The photoemissive material may be depositied by any convenient technique, such as those listed above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. A photoelectron emitting device comprising:
   a substrate having at least one major side;
   a large aspect-ratio structure extending from the at least one major side; and
   a photocathode formed on the at least one major side;
   wherein the photocathode is formed of a photoelectric converting material; and
   wherein the large aspect ratio structures are at least partially made of the photoelectric converting material.

2. A photoelectron emitting device comprising:
   a substrate having a major side and a plurality of large aspect-ratio structures extending from the major side; and
   a photocathode made of a photoelectric converting material and formed on the major side of the substrate;
   wherein the large aspect-ratio structures have an average aspect ratio of at least about 3:1; and
   wherein the large aspect ratio structures are at least partially made of the photoelectric converting material.

3. The device of claim 2 wherein the large aspect-ratio structures have an average aspect ratio of at least about 10:1.

4. The device of claim 2 wherein the large aspect-ratio structures have an average aspect ratio of at least about 50:1.

5. The device of claim 2 wherein the large aspect-ratio structures have an average aspect ratio of at least about 100:1.

6. The device of claim 2 wherein large aspect-ratio structures are substantially composed of the photoelectric converting material and wherein the large aspect ratio structures are deposited onto the substrate.

7. The device of claim 2 wherein the substrate is substantially transparent.

8. The device of claim 2 wherein the photoelectric converting material is selected from the group consisting of alkali metals.

9. The device of claim 2 wherein the photoelectric converting material is selected from the group consisting of alkali metals in concert with cesium.

10. The device of claim 2 wherein the photoelectric converting material is selected from the group consisting of column III-V compounds.

11. The device of claim 2 wherein the photoelectric converting material is selected from the group consisting of column III-V compounds in concert with cesium.

12. The device of claim 2 wherein the photoelectric converting material is selected from the group consisting of silicon carbide, amorphous diamond-like carbon, and diamond, carbon nanotubes, and quantum dots.

13. The device of claim 2 wherein the large aspect ratio structures have an average length of about 3 microns.

14. The device of claim 2 in combination with a light source and an amplifier to form a photomultiplier tube.

* * * * *